United States Patent
Yuan et al.

(10) Patent No.: US 12,406,657 B2
(45) Date of Patent: Sep. 2, 2025

(54) ADAPTABLE ACOUSTIC MODEL BUILT WITH LIMITED LABELING DATA

(71) Applicant: INTERNATIONAL BUSINESS MACHINES CORPORATION, Armonk, NY (US)

(72) Inventors: Zhong Fang Yuan, Xi'an (CN); Si Tong Zhao, Beijing (CN); Tong Liu, Xi'an (CN); Yi Chen Zhong, Shanghai (CN); Yuan Yuan Ding, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 299 days.

(21) Appl. No.: 18/167,127

(22) Filed: Feb. 10, 2023

(65) Prior Publication Data
US 2024/0274125 A1    Aug. 15, 2024

(51) Int. Cl.
G10L 15/08    (2006.01)
G10L 15/06    (2013.01)

(52) U.S. Cl.
CPC .... G10L 15/063 (2013.01); *G10L 2015/0638* (2013.01)

(58) Field of Classification Search
CPC ........ G10L 15/08; G10L 15/063; G10L 25/12
See application file for complete search history.

(56) References Cited

U.S. PATENT DOCUMENTS

| | | | |
|---|---|---|---|
| 12,039,998 B1* | 7/2024 | Kao | G10L 25/21 |
| 2020/0104319 A1 | 4/2020 | Jati | |
| 2021/0255613 A1* | 8/2021 | Mizobuchi | G01H 17/00 |
| 2024/0105211 A1* | 3/2024 | Mao | G10L 25/30 |
| 2025/0006178 A1* | 1/2025 | Li | G10L 15/01 |

FOREIGN PATENT DOCUMENTS

| | | |
|---|---|---|
| CN | 103245524 A | 8/2013 |
| CN | 109838696 A | 6/2019 |
| CN | 109886433 A | 6/2019 |
| CN | 109086888 B | 10/2020 |
| CN | 113314142 A | 8/2021 |

OTHER PUBLICATIONS

"Zero shot audio classification based on class label embeddings" Huang Xei (Year: 2019).*
Elizalde, et al., "CLAP: Learning Audio Concepts From Natural Language Supervision," ResearceGate [preprint], Jun. 9, 2022, 9 pages, arXiv:2206.04769v1, DOI:10.48550/arXiv.2206.04769, Retrieved from the Internet: <URL:https://www.researchgate.net/publication/361253229_CLAP_Learning_Audio_Concepts_From_Natural_Language_Supervision>.

(Continued)

*Primary Examiner* — Daniel Abebe
(74) *Attorney, Agent, or Firm* — Robert D. Bean (57) ABSTRACT

According to one embodiment, a method, computer system, and computer program product for building an acoustic model is provided. The present invention may include performing contrastive pre-training of the acoustic model; building a dataset classifier using prompt engineering; performing a prediction process; and performing zero-shot audio prediction using the pre-trained acoustic model.

20 Claims, 4 Drawing Sheets

(56) References Cited

OTHER PUBLICATIONS

Tris Atmaja, et al., "Machinery Fault Identification Using Blind Sound Separation and Fuzzy System," Acoustic emission vibration monitoring [conference paper], Jan. 2011, 5 pages, ResearchGate, Retrieved from the Internet: <URL:https://www.researchgate.net/publication/279806782>.

Xie, et al., "Zero-Shot Audio Classification Based On Class Label Embeddings," 2019 IEEE Workshop on Applications of Signal Processing to Audio and Acoustics (WASPAA), Oct. 20-23, 2019 [accessed on Nov. 16, 2022], pp. 264-267, IEEE, New Paltz, NY, USA, DOI: 10.1109/WASPAA.2019.8937283, Retrieved from the Internet: <URL:https://ieeexplore.ieee.org/document/8937283>.

\* cited by examiner

ADAPTABLE ACOUSTIC MODEL BUILT WITH LIMITED LABELING DATA

BACKGROUND

The present invention relates, generally, to the field of computing, and more particularly to digital audio.

Digital audio is a technology that is used to record, store, manipulate, generate, and reproduce sound. Digital audio converts sound waves into electrical signals, and thus, into a digital form. In an industrial workplace, there are a number of operations, such as production lines and rail transit maintenance, that rely on a worker's hearing for quality detection. Currently, digital audio can be used to process voice signals and automatically identify known product fault types in combination with machine learning methods. However, in order to truly optimize using digital audio for quality detection, a method and system by which digital audio can be used to detect new types of fault sounds and identify unknown categories of product fault types are needed. Thus, an improvement in digital audio has the potential to benefit workers and their safety in the industrial workplace.

SUMMARY

According to one embodiment, a method, computer system, and computer program product for building an acoustic model is provided. The present invention may include performing contrastive pre-training of the acoustic model; building a dataset classifier using prompt engineering; performing a prediction process; and performing zero-shot audio prediction using the pre-trained acoustic model.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

In the industrial field, there are a large number of processes, for example, automobile manufacturing, water conservancy, or electricity production, that rely on the hearing of workers to detect the quality of a machine and/or a part of a machine. However, with the continuous upgrading of industrial products, workers may be unable to spot certain product fault types because of unfamiliarity with the sounds produced by the industrial products. The inability to detect product fault types can, for example in a production line, increase product failure which can lead to delays and increased costs, and put a worker at a heightened risk of danger by allowing a worker to continue using a machine that could soon malfunction. Therefore, it may be likely that product production and worker safety in the industrial field are limited because of the inability of digital audio in combination with machine learning methods to process and identify new product fault types.

One way in which current methods attempt to address problems detecting product fault types is by using machine learning methods in combination with digital audio to process audio signals. The use of machine learning methods allows for the identification of product failures by regarding the fault type identification task as a classification task in machine learning and characterizing each fault type as a category. However, several deficiencies exist in the current method. One of the deficiencies of the current method is that building a machine learning model requires a large amount of audio data, and requires fine-grained data labeling, accurate to the second, which requires listening to the audio data repeatedly, making it a very time-consuming and labor-intensive process. Another deficiency of the current method is that it becomes outdated quickly because the advancements of industrial products inevitably generate new types of fault sounds, and the trained classification models can only identify known categories of fault sounds. Therefore, it becomes necessary to maintain the model regularly, including collecting data, labeling data, training and optimizing the model, validating the model, and deploying it; bringing a high maintenance cost with it. Thus, an improvement in digital audio has the potential to improve the industrial workplace, thus, benefitting the workers and their safety.

The present invention has the capacity to improve digital audio by dynamically identifying new categories of sound using limited labeling data. The present invention can learn supervised signals from natural language and train from contrastive learning using audio, which requires only coarse-grained labeled data, and can perform sound quality inspection. This improvement in digital audio can be accomplished by implementing a system that performs contrastive pre-training of an acoustic model, builds a dataset classifier using prompt engineering, performs a prediction process, and performs zero-shot audio prediction using the pre-trained acoustic model.

In some embodiments of the invention, the adaptable acoustic modeling audio determination program, herein referred to as "the program", can perform contrastive pre-training of an acoustic model. The adaptable acoustic model may comprise an audio encoder model, a text encoder model, and a dataset classifier. Contrastive pre-training of an acoustic model may comprise a preprocessing training process and a processing training process. The preprocessing training process may comprise the program preprocessing prepared audio data and corresponding coarse-grained text labels, wherein each audio file corresponds to a text description. Additionally, the preprocessing training process may comprise the program extracting feature vector representations of the audio and text data. The program can input the text data feature vectors into a text encoder model and the audio data feature vectors into an audio encoder model. The program can add the vectors of the audio segments as the acoustic features of the audio and can input the vectors into the audio encoder model for training the parameters of the audio encoder model. The program can input the obtained feature vector representations of the text data into the text encoder model for training the parameters of the text encoder model. The parameters of the audio encoder model and the text encoder model may comprise a set of vectors, wherein a vector dimension is based on the dimensions of the input features and the size of the model. The program can conduct comparing learning of the audio data with the text data.

The processing training process can comprise the program using the audio data to conduct comparative learning with the text data. Comparative learning may comprise inputting the processed text data into a text encoder, inputting the preprocessed audio data into an audio encoder, and generating the corresponding vector pair representations of the text and audio data. The program can input the obtained feature vector representations from the text data into the text encoder model. The program can input the obtained acoustic audio vectors from the audio data into the audio encoder model. The program can generate the corresponding vector pair representations from the text and audio data by introducing the generated feature vector representations from the audio and text data into a matrix. The program can identify the corresponding feature vector pair, by classifying the diagonal vector representations on the matrix where the distance between the audio and text vectors is the smallest and can mark the corresponding feature vector pair as a positive sample. Positive samples can be used in the continuous contrastive learning training of the adaptable acoustic audio model. Using positive samples in the continuous contrastive learning training may comprise to minimizing the distance between positive samples, otherwise known as the objective function, during the training process. The program can mark the rest of the vector pairs as negative samples. Negative samples can be used for feedback learning. Feedback learning may comprise learning in which the adaptable acoustic model is trained with the dissimilarity of audio and text pairs in a batch. Additionally, comparative learning may comprise the audio encoder model introducing natural language supervision signals and the text encoder model introducing sound signal supervision signals. The program may train the audio encoder model to produce a more accurate vector representation of the distribution space of an audio, wherein the distribution space of the audio vector may be depicted as similar to the vector distribution of natural language, based on introducing natural language supervision signals to the model. The program may comprise a trained text encoder and a trained audio encoder model once the model parameters of the text encoder and the audio encoders have been trained.

The program can build a data set classifier using prompt engineering. The program 200 can receive an uploaded label list to be recognized. Prompt engineering can comprise using a prompt template method to generate a text description of a text label and obtain the feature vectors corresponding to the generated text description. The program can use a prompt template to convert each label into a text description. In some embodiments of the invention, such as scenarios dealing with an ambiguous label, prompt templates may be constructed according to the ambiguous label's semantics in different scenarios. The program can introduce more prompt information into the text descriptions during the prediction process.

The program can perform an audio prediction process. The program can receive an uploaded list of labels that are expected to be identified in an audio to be predicted. The program can design a prompt template for each label on the received list. A prompt template may comprise a default template, a shape feature of the description, a color feature of the description, a sound feature of the description, etc. The program can convert the fine-grained labels of the text labels into coarse-grained text description labels. The program can input the coarse-grained text description labels into the trained text encoder model to obtain the feature vector representations of each label. The program can receive an uploaded audio to be predicted from an audio device or other similar device. The program can input the audio to be predicted into the trained audio encoder model to get the feature vector representation of the audio. The program can compare the similarities between the feature vector representation of the audio and the feature vector representations of the text labels and can identify the label with the feature vector representation most similar to the feature vector representation of the audio as the recognized prediction result.

The program can perform zero-shot audio prediction using the pre-trained acoustic model. The program can perform a zero-shot audio prediction when it detects a new sound type in an audio file. The program can input the detected audio file into the trained audio encoder model. The program can obtain the feature vector representation of the inputted audio using the trained audio encoder model. The program can extract the feature vectors of all text labels. The program can attempt to identify the corresponding feature vector pair of the feature vector representation of the inputted audio and the feature vectors of the text labels. If the program cannot identify a corresponding feature vector pair, the program can determine that it has detected a new sound type. When a new sound type is detected, the program can add a new sound type label, for example, "car door", to the label list. The program can add the new label to the adaptable acoustic model. The program can use prompt engineering to generate a text description of the new label and the corresponding feature vector of the text description. The program can calculate the similarity of the feature vector of the detected audio with the feature vectors corresponding to the text description. The program an identify the text description with the greatest similarity to the label, and then can label the audio to be recognized as a certain sound.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

The following described exemplary embodiments provide a system, method, and program product to perform contrastive pre-training of an acoustic model, build a dataset classifier using prompt engineering, perform a prediction process, and perform zero-shot audio prediction using the pre-trained acoustic model.

Figure 1:
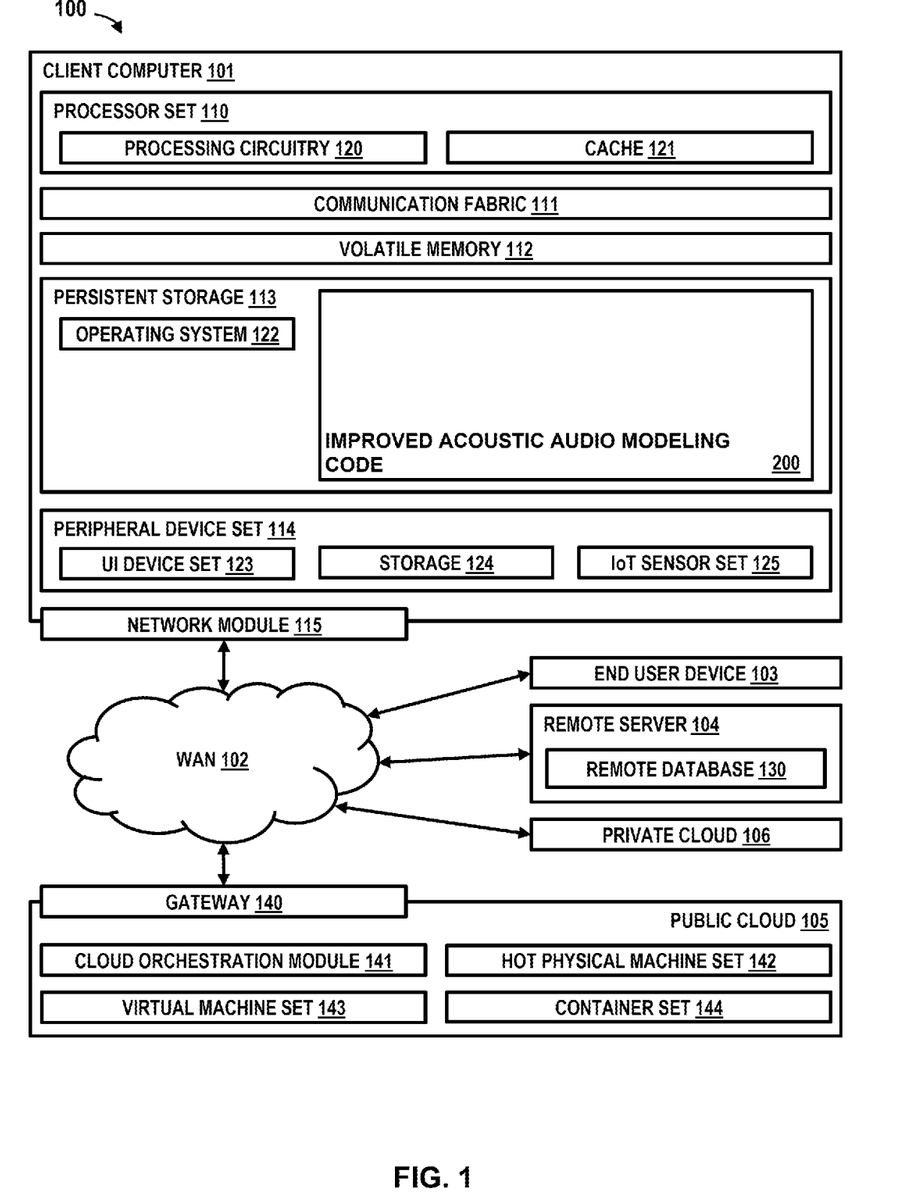
FIG. 1 illustrates an exemplary networked computer environment according to at least one embodiment.

Referring to FIG. 1, an exemplary networked computer environment 100 is depicted, according to at least one embodiment. Computing environment 100 contains an example of an environment for the execution of at least some of the computer code involved in performing the inventive methods, such as improved acoustic audio modeling code 200. In addition to code block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and code block 200, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby affect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in code block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface type operating systems that employ a kernel. The code included in code block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
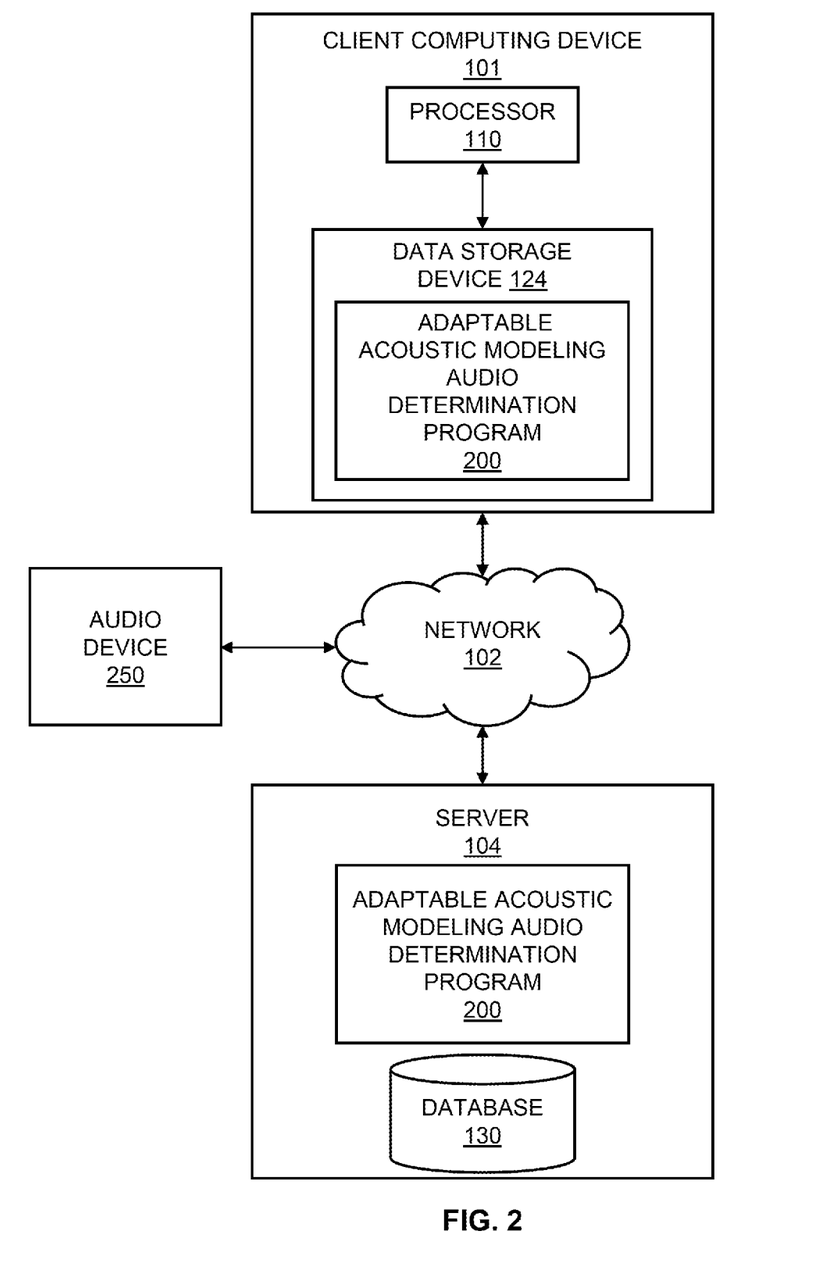
FIG. 2 illustrates an exemplary application invention environment according to at least one embodiment.

Referring to FIG. 2, an exemplary application environment is depicted, according to at least one embodiment. FIG. 2 may include client computing device 101 and a remote server 104 interconnected via a communication network 102. According to at least one implementation, FIG. 2 may include a plurality of client computing devices 101 and remote servers 104, of which only one of each is shown for illustrative brevity. It may be appreciated that FIG. 2 provides only an illustration of one implementation and does not imply any limitations with regard to the environments in which different embodiments may be implemented. Many modifications to the depicted environments may be made based on design and implementation requirements.

Client computing device 101 may include a processor 110 and a data storage device 124 that is enabled to host and run an adaptable acoustic modeling audio determination program 200 and communicate with the remote server 104 via the communication network 102, in accordance with one embodiment of the invention.

The remote server computer 104 may be a laptop computer, netbook computer, personal computer (PC), a desktop computer, or any programmable electronic device or any network of programmable electronic devices capable of hosting and running an adaptable acoustic modeling audio determination program 200 and a database 130 and communicating with the client computing device 101 via the communication network 102, in accordance with embodiments of the invention. The remote server 104 may also operate in a cloud computing service model, such as Software as a Service (SaaS), Platform as a Service (PaaS), or Infrastructure as a Service (IaaS). The remote server 104 may also be located in a cloud computing deployment model, such as a private cloud, community cloud, public cloud, or hybrid cloud.

The database 130 may be a digital repository capable of data storage and data retrieval. The database 130 can be present in the remote server 104 and/or any other location in the network 102. The database 130 can store the adaptable acoustic model, natural language processing prompt templates, feature vector representations of audio, feature vector representations of text, previously inputted audio files, text labels, text descriptions, pre-trained audio encoder model, pre-trained text encoder model, etc.

According to the present embodiment, the adaptable acoustic modeling audio determination program 200 may be a program capable of performing contrastive pre-training of an acoustic model, creating a dataset classifier from label text, and using the acoustic model for zero-shot audio prediction. The program 200 may be located on client computing device 101 or remote server 104 or on any other device located within network 102. Furthermore, the program 200 may be distributed in its operation over multiple devices, such as client computing device 101 and remote server 104. The adaptable acoustic modeling audio determination method is explained in further detail below with respect to FIG. 3.

Audio Device 252 may any apparatus that translates sound vibrations in the air into electronic signals and scribes them to a recording medium.

Figure 3:
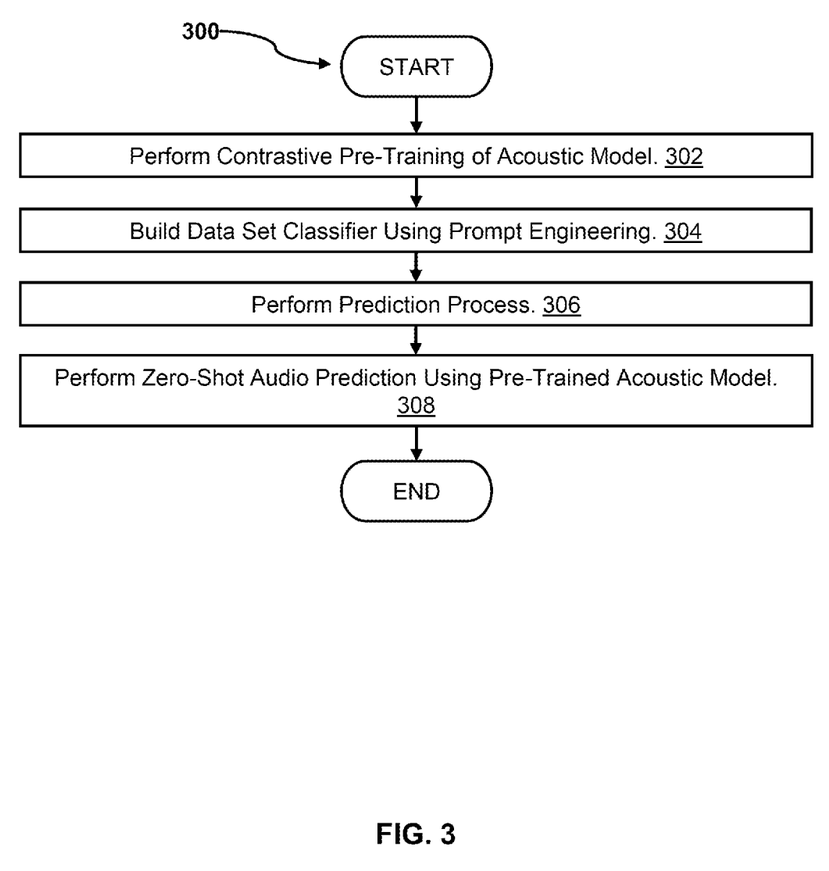
FIG. 3 is an operational flowchart illustrating an adaptable acoustic modeling audio determination process according to at least one embodiment.

Referring now to FIG. 3, an operational flowchart illustrating an adaptable acoustic modeling audio determination process 300 is depicted according to at least one embodiment. At 302, the program 200 uses contrastive learning to pre-train an adaptable acoustic model. The adaptable acoustic model may comprise an audio encoder model, a text encoder model, and a dataset classifier. The contrastive learning method may comprise a preprocessing training process and a processing training process. The preprocessing training process may comprise the program 200 preprocessing audio and text data and extracting feature vectors of the audio and text data. The program 200 can receive uploaded prepared audio data, comprising one or more audio files, and the corresponding coarse-grained text labels. Each audio file can correspond to a text description. The granularity of the text labels can be file level, without second-level fine-grained annotations. The preprocessing of the text data can comprise word segmentation, stop word removal, etc. The program 200 can extract the feature vector representations of the text data by using word2vec. The program 200 can input the obtained feature vector representations of the text data into the text encoder model for training the parameters of the text encoder model. The preprocessing of the audio data can comprise low-frequency filtering, denoising, amplitude normalization, etc. The program 200 may take each audio sliding section from the audio data and divide it into multiple audio segments. The program 200 can extract the acoustic audio feature vectors for each audio segment using mel frequency cepstral coefficients (MFCC), Logmel, etc. The program 200 can add the vectors of the audio segments as the acoustic features of the audio and can input the vectors into the audio encoder model for training the parameters of the audio encoder model. The parameters of the audio encoder model and the text encoder model may comprise a set of vectors, wherein a vector dimension is based on the dimensions of the input features and the size of the model.

The processing training process can comprise the program 200 using the audio data to conduct comparative learning with the text data. Comparative learning may comprise inputting the processed text data into a text encoder, inputting the preprocessed audio data into an audio encoder, and generating the corresponding vector pair representations of the text and audio data. The program 200 can input the obtained feature vector representations from the text data into the text encoder model. The program 200 can input the text data into a text encoder such as bidirectional encoder representations from transformers (BERT), generative pre-trained transfer (GPT), residual neural network (ResNet), etc. The program 200 can input the obtained acoustic audio vectors from the audio data into the audio encoder model.

The program 200 can input the audio data into an audio encoder such as wav2vec, Sound-CNN, autoencoder, etc. The program 200 can generate the corresponding vector pair representations from the text and audio data by introducing the generated feature vector representations from the audio and text data into a matrix. The program 200 can identify the corresponding feature vector pair, by classifying the diagonal vector representations on the matrix where the distance between the audio and text vectors is the smallest and can mark the corresponding feature vector pair as a positive sample. Positive samples can be used in the continuous contrastive learning training of the adaptable acoustic audio model. Using positive samples in the continuous contrastive learning training may comprise minimizing the distance between positive samples, otherwise known as the objective function, during the training process. The program 200 can mark the rest of the vector pairs as negative samples. Negative samples can be used for feedback learning. Feedback learning may comprise learning in which the adaptable acoustic model is trained with the dissimilarity of audio and text pairs in a batch. Additionally, comparative learning may comprise the audio encoder model introducing natural language supervision signals and the text encoder model introducing sound signal supervision signals. The program 200 may train the audio encoder model to produce a more accurate vector representation of the distribution space of an audio, wherein the distribution space of the audio vector may be depicted as similar to the vector distribution of natural language, based on introducing natural language supervision signals to the model. For example, in the vector space of natural language, the vector distance between a door and a window is relatively close, but the vector distance between a door and a puppy is far away. After introducing the natural language supervision signal, the vector distance between the door sound and the window sound in the audio vector generated by the audio encoder is closer, and the distance between the door sound and the sound of a puppy barking is farther. The program 200 may comprise a trained text encoder and a trained audio encoder model once the model parameters of the text encoder and the audio encoders have been trained.

At 304, the program 200 builds a data set classifier using prompt engineering. The program 200 can receive an uploaded label list to be recognized. Prompt engineering can comprise using a prompt template method to generate a text description of a text label and obtain the feature vectors corresponding to the generated text description. The program can use a prompt template to convert each label into a text description. Different prompt templates may be used for different labels. For example, in a certain quality inspection scenario, there may only be a few types of noise defects and thus, not many labels are required. However, in a car maintenance scenario, for example, there may be a far greater number of types of noise defects, thus, requiring more labels. Therefore, in a scenario with a greater number of types of noise defects, prompt templates can be customized to account for labels in specific scenarios. For example, in a car sound fault detection scene, the prompt template may comprise the position of the part that emits a certain sound, such as engine noise or door noise, while in a motor sound fault detection scene, the prompt template may comprise a specific sound type, such as electromagnetic noise or mechanical noise, and not comprise the position of the part that makes the certain sound. In some embodiments of the invention, such as scenarios dealing with an ambiguous label, prompt templates may be constructed according to the ambiguous label's semantics in different scenarios. The text description can correspond to audio one-to-one, similar to the coarse-grained labels in the preprocessing training text data which corresponded one-to-one with the respective audio data. A text description can comprise a prompt such as "the sound of the engine usually occurs in the car". The program 200 can introduce more prompt information into the text descriptions during the prediction process. For example, the previous text description may have more prompt information added to it, such as "there is the sound of the engine in the car". Introducing more prompt information into text descriptions during the prediction process may improve the accuracy of the adaptable acoustic model's prediction.

At 306, the program 200 preforms an audio prediction process. The program 200 can receive an uploaded list of labels that are expected to be identified in an audio to be predicted. The program 200 can design a prompt template for each label on the received list, for example, "There is the sound of car door near a car" or "There is a rumbling engine sound". A prompt template may comprise a default template, a shape feature of the description, a color feature of the description, a sound feature of the description, etc. The program 200 can convert the fine-grained labels of the text labels into coarse-grained text description labels. The program 200 can input the coarse-grained text description labels into the trained text encoder model to obtain the feature vector representations of each label. The program 200 can receive an uploaded audio to be predicted from an audio device 250 or other similar device. The program 200 can input the audio to be predicted into the trained audio encoder model to get the feature vector representation of the audio. The program 200 can compare the similarities between the feature vector representation of the audio and the feature vector representations of the text labels and can identify the label with the feature vector representation most similar to the feature vector representation of the audio as the recognized prediction result.

At 308, the program 200 performs zero-shot audio prediction using the pre-trained acoustic model. The program 200 can perform a zero-shot audio prediction when it detects a new sound type in an audio file. The program 200 can input the detected audio file into the trained audio encoder model. The program 200 can obtain the feature vector representation of the inputted audio using the trained audio encoder model. The program 200 can extract the feature vectors of all text labels. The program 200 can attempt to identify the corresponding feature vector pair of the feature vector representation of the inputted audio and the feature vectors of the text labels. If the program 200 cannot identify a corresponding feature vector pair, the program can determine that it has detected a new sound type. When a new sound type is detected, the program 200 can add a new sound type label, for example, "car door", to the label list. The program 200 can add the new label to the adaptable acoustic model. The program 200 can use prompt engineering to generate a text description of the new label and the corresponding feature vector of the text description. For example, after adding a sound type label "car door", the program 200 can use prompt engineering to generate the text description of the label, and then obtain the feature vectors corresponding to the text description. The program 200 can calculate the similarity of the feature vector of the detected audio with the feature vectors corresponding to the text description. The program 200 can identify the text description with the greatest similarity to the label, and then can label the audio to be recognized as a certain sound, such as the sound of a "car door" closing.

Figure 4:
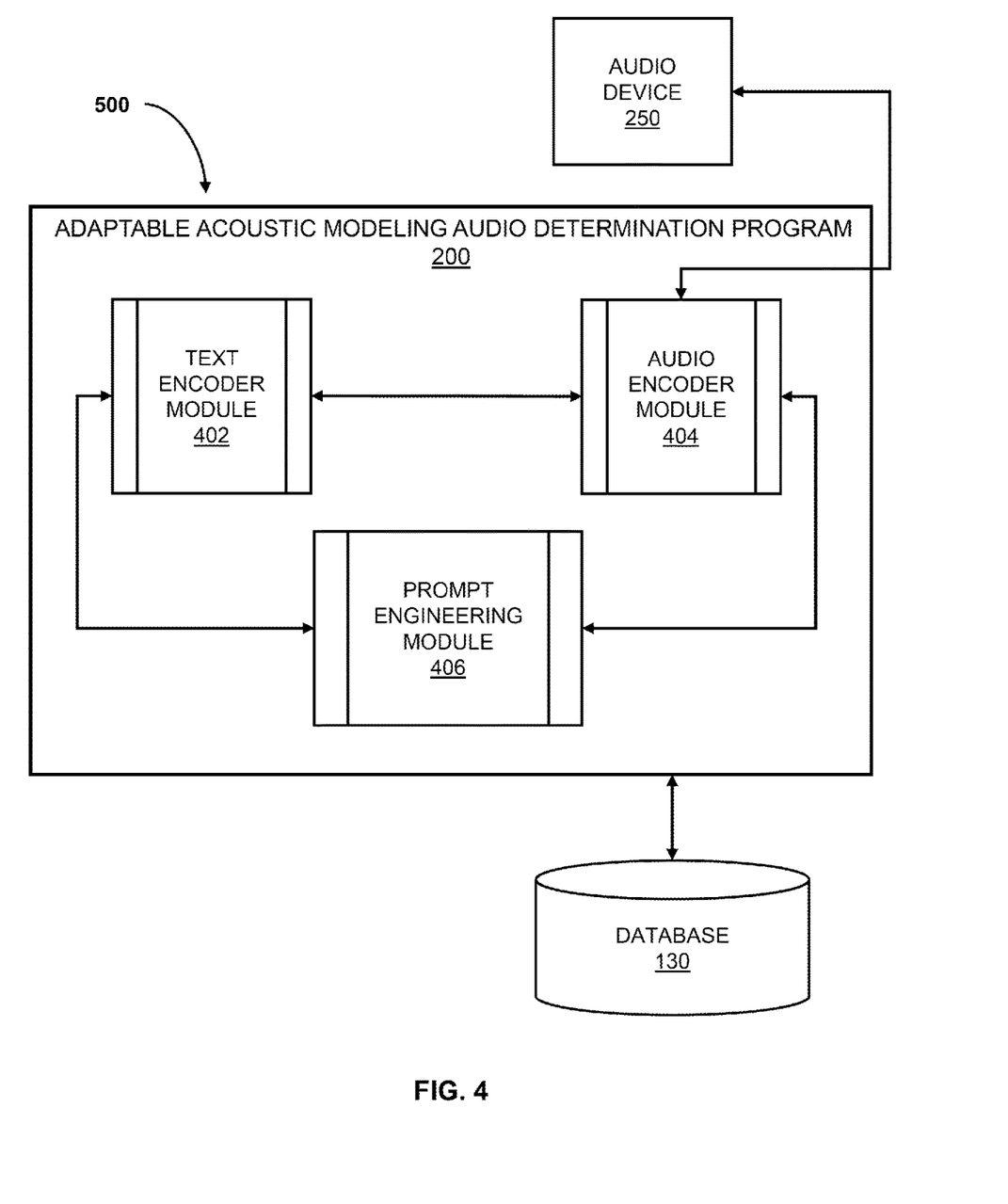
FIG. 4 is a system diagram illustrating an exemplary program environment of an implementation of an adaptable acoustic modeling audio determination process according to at least one embodiment.

Referring now to FIG. 4, a system diagram illustrating an exemplary program environment 400 of an implementation of an adaptable acoustic modeling audio determination process 300 is depicted according to at least one embodiment. Here, the program 200 comprises a text encoder module 402, an audio module 404, and a prompt engineering module 406. The exemplary program environment 400 details the interactions between the text encoder module 402 and the audio encoder module 404, the text encoder module and the prompt engineering module 406, the audio encoder module 404 and the prompt engineering module 406, the audio encoder module 404 and the audio device 250, and the program 200 and the database 130.

The text encoder module 402 may be used to obtain feature vector representations of text data. The audio encoder module 404 may be used to obtain vector representations of inputted audio and also to communicate with the audio device 250. The prompt engineering module 406 may be used to design prompt templates and apply the prompt templates to text labels.

It may be appreciated that FIGS. 2 through 4 provide only an illustration of one implementation and do not imply any limitations with regard to how different embodiments may be implemented. Many modifications to the depicted environments may be made based on design and implementation requirements.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for building an acoustic model, the method comprising:
performing contrastive pre-training of the acoustic model;
building a dataset classifier using prompt engineering, wherein the prompt engineering comprises using one or more prompt templates to convert each of one or more received labels into one or more text descriptions;
performing a prediction process; and
performing zero-shot audio prediction using the pre-trained acoustic model and the one or more text descriptions.

2. The method of claim 1, wherein the acoustic model comprises an audio encoder model, a text encoder model, and the dataset classifier.

3. The method of claim 1, wherein performing the prediction process and/or performing the zero-shot audio prediction using the pre-trained acoustic model, comprises obtaining feature vector representations of each text label and audio data, comparing the feature vector representations of each text label and the audio data, and recognizing corresponding vector pairs as a prediction.

4. The method of claim 1, further comprising:
performing comparative training of the acoustic model, wherein an audio encoder model introduces natural language supervision signals, and a text encoder model introduces sound signal supervision signals; and
performing feedback training of the acoustic model.

5. The method of claim 1, wherein building the dataset classifier using the prompt engineering comprises designing a prompt template for each text label.

6. The method of claim 1, further comprising:
detecting a new sound type from audio data;
creating a new sound type text label for the new sound type; and
designing a new prompt template for the new sound type text label.

7. The method of claim 1, wherein performing the contrastive pre-training of the acoustic model comprises a preprocessing training step and a processing training step.

8. A computer system for building an acoustic model, the computer system comprising:
one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
performing contrastive pre-training of the acoustic model;
building a dataset classifier using prompt engineering, wherein the prompt engineering comprises using one or more prompt templates to convert each of one or more received labels into one or more text descriptions;
performing a prediction process; and
performing zero-shot audio prediction using the pre-trained acoustic model and the one or more text descriptions.

9. The computer system of claim 8, wherein the acoustic model comprises an audio encoder model, a text encoder model, and the dataset classifier.

10. The computer system of claim 8, wherein performing the prediction process and/or performing the zero-shot audio prediction using the pre-trained acoustic model, comprises obtaining feature vector representations of each text label and audio data, comparing the feature vector representations of each text label and the audio data, and recognizing corresponding vector pairs as a prediction.

11. The computer system of claim 8, further comprising:
performing comparative training of the acoustic model, wherein an audio encoder model introduces natural language supervision signals, and a text encoder model introduces sound signal supervision signals; and
performing feedback training of the acoustic model.

12. The computer system of claim 8, wherein building the dataset classifier using the prompt engineering comprises designing a prompt template for each text label.

13. The computer system of claim 8, further comprising:
detecting a new sound type from audio data;
creating a new sound type text label for the new sound type; and
designing a new prompt template for the new sound type text label.

14. The computer system of claim 8, wherein performing the contrastive pre-training of the acoustic model comprises a preprocessing training step and a processing training step.

15. A computer program product for building an acoustic model, the computer program product comprising:
one or more computer-readable tangible storage medium and program instructions stored on at least one of the one or more tangible storage medium, the program instructions executable by a processor to cause the processor to perform a method comprising:
performing contrastive pre-training of the acoustic model;
building a dataset classifier using prompt engineering, wherein the prompt engineering comprises using one or more prompt templates to convert each of one or more received labels into one or more text descriptions;
performing a prediction process; and
performing zero-shot audio prediction using the pre-trained acoustic model and the one or more text descriptions.

16. The computer program product of claim 15, wherein the acoustic model comprises an audio encoder model, a text encoder model, and the dataset classifier.

17. The computer program product of claim 15, wherein performing the prediction process and/or performing the zero-shot audio prediction using the pre-trained acoustic model, comprises obtaining feature vector representations of each text label and audio data, comparing the feature vector representations of each text label and the audio data, and recognizing corresponding vector pairs as a prediction.

18. The computer program product of claim 15, further comprising:
performing comparative training of the acoustic model, wherein an audio encoder model introduces natural language supervision signals, and a text encoder model introduces sound signal supervision signals; and
performing feedback training of the acoustic model.

19. The computer program product of claim 15, wherein building the dataset classifier using the prompt engineering comprises designing a prompt template for each text label.

20. The computer program product of claim 15, further comprising:
detecting a new sound type from audio data;
creating a new sound type text label for the new sound type; and
designing a new prompt template for the new sound type text label.

* * * * *